United States Patent [19]

Morita et al.

[11] Patent Number: 4,651,980
[45] Date of Patent: Mar. 24, 1987

[54] VIBRATION ISOLATOR

[75] Inventors: Isamu Morita; Katsuyoshi Arai; Tetsuya Koike, all of Saitama, Japan

[73] Assignee: Honda Giken Kogyo Kabushiki Kaisha, Tokyo, Japan

[21] Appl. No.: 703,366

[22] Filed: Feb. 20, 1985

[30] Foreign Application Priority Data

Feb. 21, 1984 [JP] Japan .................................. 59-31288
Feb. 21, 1984 [JP] Japan .................................. 59-31289

[51] Int. Cl.$^4$ ............................................. F16F 9/10
[52] U.S. Cl. .................................. 267/140.1; 267/140.3
[58] Field of Search ............... 267/140.1, 140.4, 141.1, 267/35, 63 A, 122, 123, 158, 113, 134; 248/562; 188/298, 322.13, 322.15

[56] References Cited

U.S. PATENT DOCUMENTS

| 1,992,555 | 2/1935 | Templin | 188/298 X |
| 4,159,091 | 6/1979 | Le Salver et al. | 267/113 X |
| 4,407,491 | 10/1983 | Kunihiro et al. | 267/140.1 |
| 4,422,779 | 12/1983 | Hamaekers et al. | 267/8 R X |
| 4,469,316 | 9/1984 | van den Boom et al. | 267/140.1 |

FOREIGN PATENT DOCUMENTS

| 27751 | 4/1981 | European Pat. Off. | 267/140.1 |
| 98330 | 1/1984 | European Pat. Off. | 267/140.1 |
| 115417 | 8/1984 | European Pat Off. | 267/140.1 |
| 3140783 | 4/1983 | Fed. Rep. of Germany | 267/140.1 |
| 163747 | 3/1981 | Japan | 267/140.1 |
| 2068079 | 8/1981 | United Kingdom | 267/140.1 |

Primary Examiner—Duane A. Reger
Attorney, Agent, or Firm—Armstrong, Nikaido, Marmelstein & Kubovcik

[57] ABSTRACT

A vibration isolator for mounting a vibrating body on a structural body includes a first attachment member adapted to be connected to the vibrating body, a second attachment member adapted to be connected to the structural body, and an elastically deformable resilient member fixed to and interconnecting the first and second attachment members, the resilient member being elastically deformable in response to relative movement of the first attachment member with respect to the second attachment member. The vibration isolator has a first chamber defined at least partly by the resilient member and having a volume variable dependent on elastic deformation of the resilient member, and a second chamber operatively communicating with the first chamber through an operative communication structure and having a volume variable dependent on variation of the volume of the first chamber, the first and second chambers being filled with a liquid. The operative communication structure includes a flexible film dividing the first and second chambers from each other and an arrangement for limiting movement of the flexible film.

6 Claims, 12 Drawing Figures

VIBRATION ISOLATOR

BACKGROUND OF THE INVENTION

1. Field of the Invention

The present invention relates to a vibration isolator for mounting a vibrating body on a structural body.

2. Description of the Prior Art

For mounting vibrating bodies such as engines on structural bodies such as automobile chassis, there have heretofore been widely employed vibration isolators each composed of two attachment members joined respectively to the vibrating body and the structural member and a resilient block of rubber fixed to the attachment members to couple them. In the conventional vibration isolator of the above type, the resiliency of the rubber block serves as a spring for absorbing shocks and the internal friction of the rubber block due to yielding thereof serves as a damper for dissipating the energy of vibration. The vibration isolator is required to be designed with a view to both reducing vibrations transmitted to the structural body and supporting the vibrating body securely on the structural body, dependent on the static load to be borne and the intensity and the frequency of vibrations of the vibrating body.

It is relatively easy to design a vibration isolator the frequency of vibrations of the vibrating body is constant or in a narrow range. However, in the event that the vibration frequency varies normally in a wide range, it has been difficult to design a vibration isolator capable of sufficiently isolating all vibrations in the wide frequency range. For example, a four-cylinder four-stroke aubomotive engine normally operating in a range of from about 600 r.p.m. to 6,000 r.p.m. vibrates in a frequency range of from about 20 Hz to 200 Hz. Any vibration isolators conventionally avaiable for mounting such an automotive engine have proven satisfactory in isolating engine vibrations merely in a portion of the above frequency range.

SUMMARY OF THE INVENTION

The present invention has been accomplished in an effort to solve the foregoing prior problem.

It is an object of the present invention to provide a vibration isolator capable of supporting a vibrating body vibrating in a wide frequency range while isolating produced vibrations in the entire frequency range.

Another object of the present invention is to provide a vibration isolator capable of appropriately supporting a vibrating body, the amplitude of the vibration of which varies dependent on the vibration frequency.

Still another object of the present invention is to provide a vibration isolator suitable for use in mounting an automotive engine, for example, on an automotive chassis.

According to the present invention, a vibration isolator for mounting a vibrating body on a structural body includes a first attachment member adapted to be connected to the vibrating body, a second attachment member adapted to be connected to the structural body, and an elastically deformable resilient member fixed to and interconnecting the first and second attachment members, the resilient member being elastically deformable in response to relative movement of the first attachment member with respect to the second attachment member. The vibration isolator has a first chamber defined at least partly by the resilient member and having a volume variable dependent on elastic deformation of the resilient member, and a second chamber operatively communicating with the first chamber through an operative communication structure and having a volume variable dependent on variation of the volume of the first chamber, the first and second chambers being filled with a liquid. The operative communication structure includes a flexible film dividing the first and second chambers from each other and means for limiting movement of the flexible film.

The above and further objects, details and advantages of the present invention will become apparent from the following detailed description of preferred embodiments thereof, when read in conjunction with the accompanying drawings.

DESCRIPTION OF THE PREFERRED EMBODIMENTS

Figure 1:
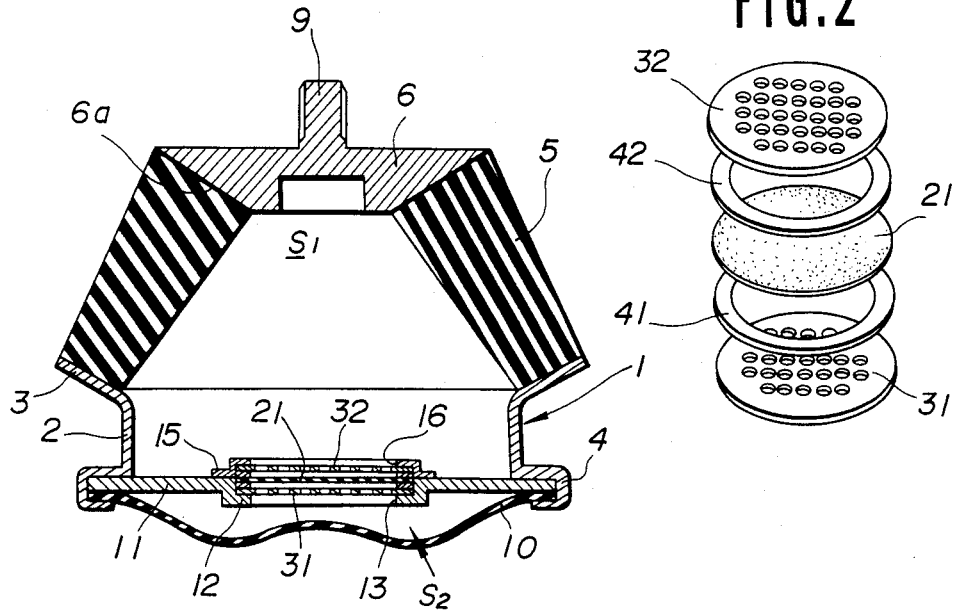
FIG. 1 is a vertical cross-sectional view of a vibration isolator according to a first embodiment of the present invention.

Identical or corresponding parts are denoted by identical or corresponding reference characters throughout the views.

FIG. 1 shows in vertical cross section a vibration isolator according to a first embodiment of the present invention. The vibration isolator includes a base member 1 having a tubular portion 2 including an upper tapered female tubular portion 3 and a lower annular grip portion 4 of a channel-shaped cross section. An umbrella-shaped resilient member 5 of rubber having a thick wall is joined by curing to an inner peripheral surface of the tapered female tubular portion 3. An attachment member 6 comprising a thick circular plate has a tapered male surface 6a along an outer periphery thereof, the resilient member 5 being also joined by curing to the tapered male surface 6a. A partition or support plate 11 and a diaphragm 10 composed of a thin rubber sheet therebelow are circumferentially disposed in and gripped by the annular grip 4.

For mounting a vibrating body on a structural body, it is the general practice to join the attachment member 6 and the base member 1 respectively to the vibrating body and the structural body. As can readily be undersood, however, the attachment member 6 may be coupled to the structural body while the base member 1 may be coupled to the vibrating body. A first chamber $S_1$ is defined above the partition 11 primarily by the resilient member 5, and a second chamber $S_2$ is defined beneath the partition 11 by the partition 11 and the diaphragm 10.

Figure 2:
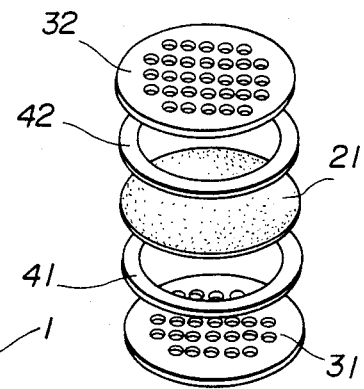
FIG. 2 is an exploded perspective view of an operative communication structure in the vibration isolator shown in FIG. 1.

The partition 11 has a central circular recessed step 12 of a relatively large diameter including a large-diameter circular hole 13 defined therein. A perforated disk 31 (see FIG. 2) is placed on the recessed step 12, and a circular flat film 21 of rubber is superposed thereover with a spacer ring 41 interposed therebetween. Another perforated disk 32 is positioned over the rubber film 21 with a spacer ring 42 interposed therebetween. A fixing annular plate 15 of a stepped configuration having a circular hole 16 equal in diameter to the circular hole 13 is joined to the partition 11 around a peripheral edge of the recessed step 12. The rubber film 21 and the perforated disks 31, 32 constitute an operative communication structure providing fluid pressure communication between the first and second chambers $S_1$, $S_2$. The first and second chambers $S_1$, $S_2$ thus held in operative communication with each other through the assembly of FIG. 2 are filled with a liquid.

The functions of the vibration isolator will be described with reference to an application in which the vibration isolator is employed to mount an engine on an automotive chassis. The base member 1 is fixed to the chassis and the engine is fastened to an attachment screw 9 projecting from the attachment member 6. It is known that automotive engines vibrate in a wide frequency range, and that the amplitude of vibrations at lower frequencies is relatively higher, while the amplitude of vibrations at higher frequencies is relatively lower. When the attachment member 6 is subjected to low-amplitude vibrations produced at a high frequency by the engine, the pressure of the liquid in the first chamber $S_1$ periodically varies at the same frequency. However, since the rubber film 21 vertically flexes due to the pressure variations in the chamber $S_1$, the pressure variations in the first chamber $S_1$ can mostly be taken up by the rubber film 21. Stated otherwise, variations in the volume of the first chamber $S_1$ can be compensated for by the vertical displacements of the rubber film 21. Therefore, the vibration isolator can reduce the transmission of the high-frequency vibrations to thereby lower vibrations and noise generated in the passenger compartment of the automobile on which the engine is mounted, while the engine is rotating at high speeds.

When low-frequency, high-amplitude vibrations are applied by the engine to the attachment member 6, vertical displacements of the rubber film 21 are limited by the perforated disks 31, 32 to guard against excessive deformations or variations in the volume of the first chamber $S_1$. The vibration isolator can therefore have a required bearing force and hence suppress engine vibrations or swinging movements of large amplitude at low speeds of rotation of the engine.

Other embodiments of the present invention will be described below. Since these embodiments have the same construction as that of the first embodiment, except for the operative communition structure, identical structural details will not be described in detail.

Figure 3:
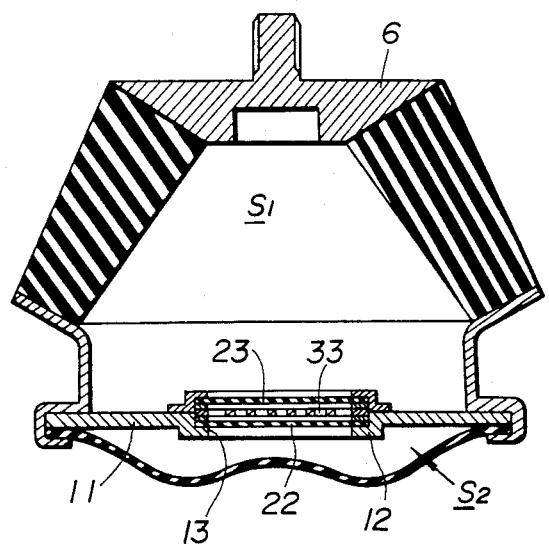
FIG. 3 is a vertical cross-sectional view of a vibration isolator according to a second embodiment of the present invention.
Figure 4:
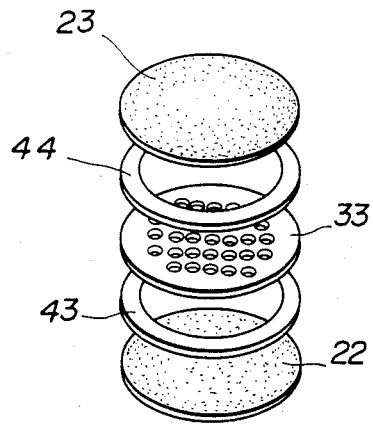
FIG. 4 is an exploded perspective view of an operative communication structure in the vibration isolator shown in FIG. 3.

FIGS. 3 and 4 illustrate a vibration isolator according to a second embodiment of the invention. A film 22 of rubber is placed on the recessed step 12 of the partition 11, and a perforated disk 33 is put over the rubber film 22 with a spacer ring 43 interposed therebetween. Another film 23 of rubber is disposed over the perforated disk 33 with a spacer ring 44 interposed therebetween. With the two rubber films 22, 23 disposed below and above the perforated disk 33 in spaced relation, the operative communication structure allows the vibration isolator to operate in the same manner as the vibration isolator of the first embodiment.

Figure 5:
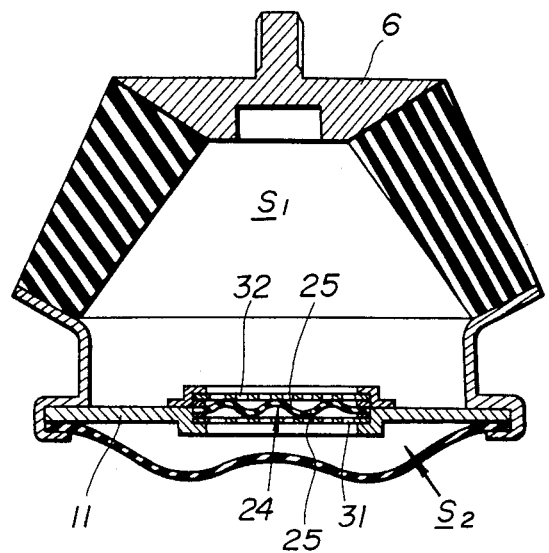
FIG. 5 is a vertical cross-sectional view of a vibration isolator according to a third embodiment of the present invention.
Figure 6:
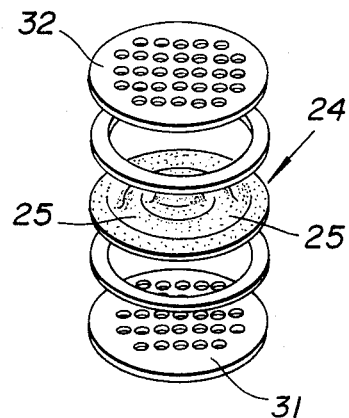
FIG. 6 is an exploded perspective view of an operative communication structure in the vibration isolator shown in FIG. 5.

FIGS. 5 and 6 show a vibration isolator according to a third embodiment of the invention. An operative communication structure of the third embodiment is different from that of the first embodiment in that the flat rubber film 21 is replaced with a rubber film 24 having vertical undulations 25 in its free state, the rubber film 24 being disposed between the upper and lower perforated disks 31, 32. Since the undulating or wavy rubber film 24, unlike the flat rubber film 21, produces substantially no tension when it is elastically deformed, it imposes a smaller reactive force due to the tension of the rubber film on the liquid when the vibration isolator undergoes high-frequency vibrations, resulting in an increased ability to dampen variations in the liquid pressure. When the vibration isolator is subjected to low-frequency vibrations, the undulations 25 intefere with the perforated disks 31, 32 to reduce striking sounds produced when the rubber film 24 is limited in its vertical displacements by the perforated disks 31, 32.

Figure 7:
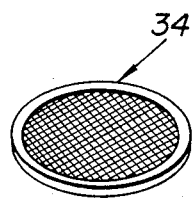
FIG. 7 is a perspective view of an alternative of a perforated disk in each of the operative communication structures shown in FIGS. 2, 4, and 6.

While in the first through third embodiments the perforated disks are employed to limit vertical displacements of the flexible rubber films, a net or mesh 34 (FIG. 7) of filamentary materials such as wires may be used as a perforated disk for reducing any striking sounds produced upon contact with the flexible rubber films.

Figure 8:
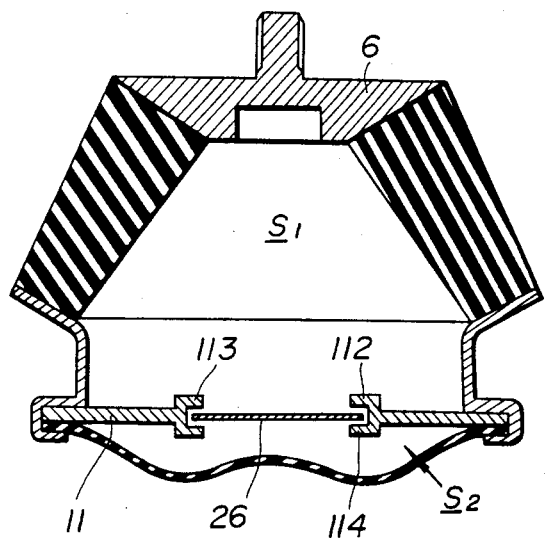
FIG. 8 is a vertical cross-sectional view of a vibration isolator according to a fourth embodiment of the present invention.

A vibration isolator according to a fourth embodiment will be described with reference to FIG. 8. The vibration isolator of FIG. 8 comprises a partition 11 having a central hollow cylindrical member 112 having a relatively large diameter and a small height or axial length. The cylindrical member 112 has upper and lower flanges 113, 114 on respective axially opposite ends thereof. A thin circular leaf spring 26 is vertically movably disposed in the cylindrical member 112. When the vibration isolator is subjected to high-frequency vibrations, the leaf spring 26 is vertically displaced between the flanges 113, 114 dependent on the liquid pressure, and is caused to flex by the liquid pressure. Therefore, the vibration isolator is effective to reduce the transmission of vibrations of small amplitude. Inasmuch as the movement of the leaf spring 26 is confined within the cylindrical member 112 by engagement with the upper and lower flanges 113, 114, the vibration isolator can provide a liquid pressure required for dampening low-frequency vibrations of large amplitude.

Figure 9:
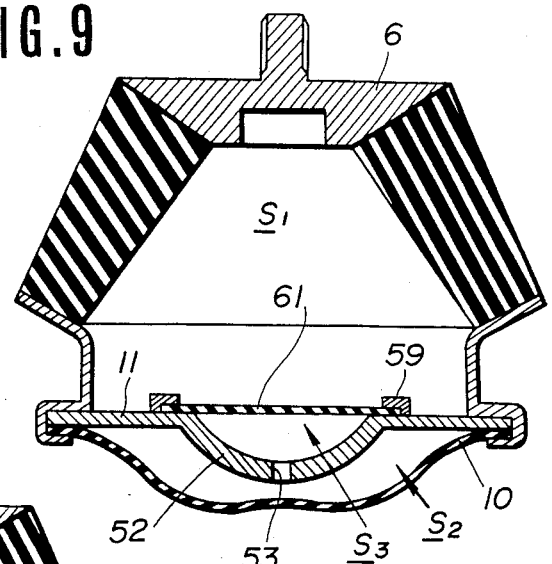
FIG. 9 is a vertical cross-sectional view of a vibration isolator according to a fifth embodiment of the present invention.

FIG. 9 shows a fifth embodiment of the present invention in which a partition 11 has a central substantially hemispherical recessed portion 52 of a relatively large diameter which projects downwardly and has a central orifice 53 defined therethrough in the form of a circular hole. A rubber film 61 is placed over the recessed portion 52 and has a peripheral edge overlapping a peripheral edge of the recessed portion 52 and gripped between the peripheral edge of the recessed portion 52 and a fixing annular plate 59 joined to the partition 11. The rubber film 61 and the recessed portion 52 jointly define a subchamber $S_3$ therebetween which operatively communicates with the first chamber $S_1$ through elastic deformation of the rubber film 61 and also communicates with the second chamber $S_2$ through the orifice 53.

The substantially hemispherical recessed portion 52 projecting into the lower second chamber $S_2$ is covered with the rubber film 61. With this construction, when small high-frequency vibrations are applied to the attachment member 6 to develop a liquid pressure buildup in the first chamber $S_1$, the rubber film 61 is caused by the liquid pressure buildup to flex in the downward direction, thereby reducing the increase in the liquid pressure in the first chamber $S_1$. Since variations in the volume of the first chamber $S_1$ due to the small vibrations applied to the vibration isolator can therefore be compensated for by vertical displacements of the rubber film 61, the spring constant of the vibration isolator is reduced to lower the transmission of small vibrations at high frequencies. Consequently, vibrations and noise in the passenger's compartment of the automobile can be decreased while the engine is rotating at high speeds.

The subchamber $S_3$ and the second chamber $S_2$ therebelow which are held in mutual communication through the orifice 53 provide the following advantages: When the engine is started, the vibration isolator is subjected to a large load produced upon low-speed rotation of the engine to increase the liquid pressure in the first chamber $S_1$ to a level beyond a prescribed pressure. The rubber film 61 then tends to flex downwardly to a large extent for thereby forcing the liquid to flow from the subchamber $S_3$ through the orifice 53 into the second chamber $S_2$. Since the orifice 53 restricts the liquid flow therethrough, the subchamber $S_3$ develops a pressure buildup therein which will act as a reactive force on the first chamber $S_1$. As a result, the spring constant of the vibration isolator is increased to enable the vibration isolator to suppress engine vibrations or swinging movements of large amplitude while the engine is rotating at low speeds. When the engine rotates at medium speeds, the liquid is moved through the orifice 53 as the rubber film 61 is displaced vertically. The vibration isolator can thus produce a damping force to dampen engine vibrations.

Figure 10:
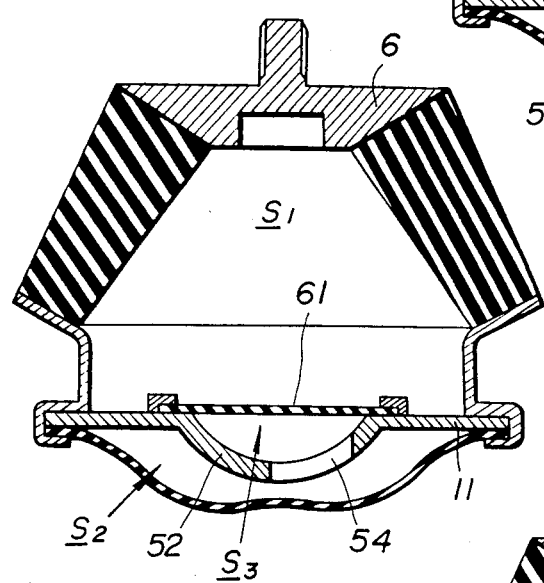
FIG. 10 is a vertical cross-sectional view of a modification of the vibration isolator illustrated in FIG. 9.
Figure 11:
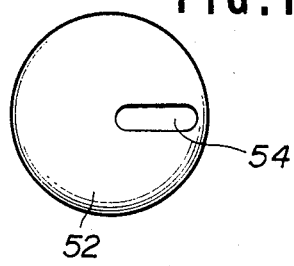
FIG. 11 is a plan view showing the shape of an orifice in the vibration isolator of FIG. 10.

As shown in FIGS. 10 and 11, the hemispherical recessed portion 52 may have a slot-shaped orifice 54 defined therethrough and extending as an elongate hole radially outwardly from the center of the recessed portion 52.

Figure 12:
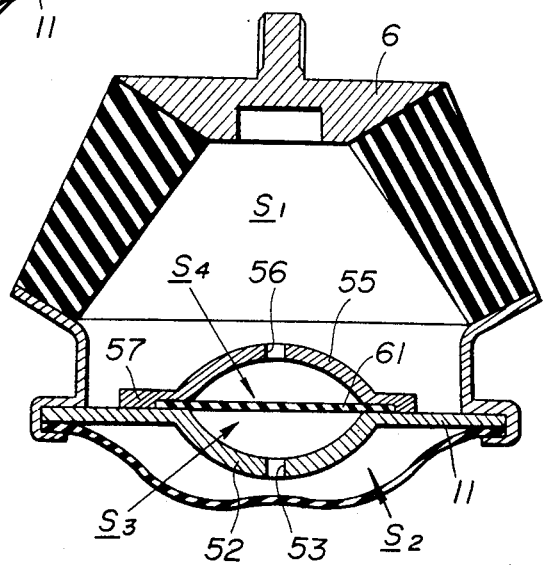
FIG. 12 is a vertical cross-sectional view of a vibration isolator according to a sixth embodiment of the present invention.

A vibration isolator according to a sixth embodiment will be described with reference to FIG. 12. The vibration isolator of FIG. 12 is similar to that of FIG. 9, except that a substantially hemispherical member 55 projects into the upper first chamber $S_1$ and has a central orifice 56. The hemispherical member 55 has a peripheral flange 57 jointed to a peripheral edge of the substantially hemispherical recessed portion 52 of the partition 11. The rubber film 61 is gripped between the peripheral flange of the hemispherical member 55 and the peripheral edge of the hemispherical recess portion 52. The hemispherical member or recessed portion 55 disposed in the first chamber $S_1$ defines a subchamber $S_4$ between itself and the rubber film 61. The symmetrical subchambers $S_3$, $S_4$ are provided on both sides of the rubber film 61. Therefore, the recessed portions 55, 52 project respectively into the chambers $S_1$, $S_2$ and define the two small subchambers $S_4$, $S_3$ above and below the rubber film 61. The subchambers $S_4$, $S_3$ are held in communication with the first and second chambers $S_1$, $S_2$, respectively, through the orifices 53, 56. The vibration isolator thus constructed can produce the same advantageous effects as those of the fifth embodiment equally in both directions in which vibrations are applied to compress and expand the vibration isolator.

With the fifth and sixth embodiments, as described above, the partition between the first and second chambers $S_1$, $S_2$ has a recessed portion projecting into at least one of the first and second chambers, and the recessed portion is covered with a flexible film or rubber film to define a subchamber therein, the recessed portion having an orifice. When high-frequency vibrations are applied to the vibration isolator, the vibration isolator suppresses a liquid pressure buildup therein to thereby reduce the spring constant thereof. The vibration isolator can therefore reduce noise induced by vibrations of small amplitude produced by an engine, for example, while it is rotating at high speeds. The vibration isolator can provide a liquid pressure required to dampen vibrations of large amplitude produced when the engine rotates at low speeds, with the result that the spring constant of the vibration isolator is increased to suppress displacements thereof under a large load. When the engine rotates at medium speeds, the orifice generates a damping force for an increased vibration damping capability.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A vibration isolater for mounting a vibration body on a structural body, comprising:
   (a) a first attachment member adapted to be connected to the vibrating body;
   (b) a second attachment member adapted to be connected to the structural body;
   (c) an elastically deformable resilient member fixed to and interconnecting said first and second attachment members, said resilient member being elastically deformable in response to relative movement of said first attachment member with respect to said second attachment member;
   (d) a first chamber defined at least partly by said resilient member and having a volume variable dependent on elastic deformation of said resilient member;
   (e) a second chamber operatively communicating with said first chamber solely through an operative pressure communication structure and having a volume variable dependent on variation of the volume of said first chamber, said first and second chambers being filled with a liquid; and (f) said operative pressure communication structure including a flexible film dividing said first and second chambers from each other and preventing fluid communication between said first and second chambers, and means for substantially limiting deformation of the flexible film so that said operative communication structure selectively prevents and permits solely pressure communication between said first and second chambers when the deformation of said flexible film is respectively limited and not limited by said means.

2. A vibration isolator according to claim 1, including a partition lying between said first and second chambers and having an opening closed by said flexible film.

3. A vibration isolator according to claim 2, wherein said flexible film comprises a rubber film.

4. A vibration isolator according to claim 3, wherein said rubber film has undulations.

5. A vibration isolator according to claim 3, wherein said limiting means comprises a perforated member for limiting deformation of said rubber film.

6. A vibration isolater according to claim 1, including a partition which lies between said first and second chambers and has a recessed portion projecting toward said second chamber and with an orifice defined therein, said limiting means comprising said recessed portion, said flexible film covering said recessed portion, said recessed portion and said flexible film cooperating with each other so as to define a third chamber therebetween.

* * * * *